(12) United States Patent
Yang et al.

(10) Patent No.: US 12,304,322 B2
(45) Date of Patent: May 20, 2025

(54) INFORMATION PROCESSING SYSTEM, CONTROL DEVICE, AND VEHICLE POWER SUPPLY SYSTEM

(71) Applicant: Panasonic Intellectual Property Management Co., Ltd., Osaka (JP)

(72) Inventors: Changhui Yang, Osaka (JP); Masaya Ugaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 672 days.

(21) Appl. No.: 17/286,885

(22) PCT Filed: Oct. 3, 2019

(86) PCT No.: PCT/JP2019/039072
§ 371 (c)(1),
(2) Date: Apr. 20, 2021

(87) PCT Pub. No.: WO2020/090341
PCT Pub. Date: May 7, 2020

(65) Prior Publication Data
US 2021/0379999 A1   Dec. 9, 2021

(30) Foreign Application Priority Data
Oct. 31, 2018  (JP) ................................ 2018-205527

(51) Int. Cl.
*B60L 58/16* (2019.01)
*B60L 15/20* (2006.01)
(Continued)

(52) U.S. Cl.
CPC ........... *B60L 15/2045* (2013.01); *B60L 58/12* (2019.02); *B60L 58/16* (2019.02); *G07C 5/0816* (2013.01);
(Continued)

(58) Field of Classification Search
CPC ...... B60L 15/2045; B60L 58/12; B60L 58/16; B60L 2240/12; B60L 2240/545;
(Continued)

(56) References Cited

U.S. PATENT DOCUMENTS

2012/0053771 A1   3/2012 Yoshida
2013/0332020 A1*  12/2013 Uchihara ............... B60W 10/08
                                                  180/65.265
(Continued)

FOREIGN PATENT DOCUMENTS

JP   2012-050299    3/2012
JP   2017-159741    9/2017

OTHER PUBLICATIONS

International Search Report of PCT application No. PCT/JP2019/039072 dated Dec. 24, 2019.

*Primary Examiner* — Peter D Nolan
*Assistant Examiner* — Chanmin Park
(74) *Attorney, Agent, or Firm* — Rimon P.C.

(57) ABSTRACT

Based on gradient information included in road information on a path scheduled to be traveled by an electric vehicle, a section divider divides the path into multiple sections. A discharge-plan-candidate deriving unit derives multiple discharge plans defined by a combination of a target SOC of a secondary battery at the time of departure and a target SOC at the time of arrival at a destination, based on required capacity of the secondary battery. A section deterioration-amount calculator calculates a deterioration rate or an amount of deterioration of the secondary battery in each of the sections based on an SOC usage range and an output current of the secondary battery in the corresponding one of the sections with reference to a discharge deterioration map defining a relationship between a combination of the SOC usage range in the corresponding one of the sections and a discharge rate, and the deterioration rate of the secondary (Continued)

battery. A discharge plan selector selects a discharge plan minimizing a total deterioration rate or the amount of deterioration from among the multiple discharge plans.

8 Claims, 10 Drawing Sheets

(51) Int. Cl.
*B60L 58/12* (2019.01)
*G07C 5/08* (2006.01)
*H02J 7/00* (2006.01)
*H02J 7/14* (2006.01)

(52) U.S. Cl.
CPC ............ *H02J 7/0048* (2020.01); *H02J 7/005* (2020.01); *H02J 7/14* (2013.01); *B60L 2240/12* (2013.01); *B60L 2240/545* (2013.01); *B60L 2240/549* (2013.01); *B60L 2240/62* (2013.01); *B60L 2240/64* (2013.01); *B60L 2240/665* (2013.01); *B60L 2240/667* (2013.01); *B60L 2250/10* (2013.01); *B60L 2250/16* (2013.01)

(58) Field of Classification Search
CPC ........... B60L 2240/549; B60L 2240/62; B60L 2240/64; B60L 2240/665; B60L 2240/667; B60L 2250/10; B60L 2250/16; B60L 2240/622; B60L 2240/642; B60L 2260/54; B60L 58/13; G07C 5/0816; H02J 7/0048; H02J 7/005; H02J 7/14; Y02T 90/16; Y02T 10/70; Y02T 10/72
See application file for complete search history.

(56) References Cited

U.S. PATENT DOCUMENTS

| | | | |
|---|---|---|---|
| 2017/0151891 A1* | 6/2017 | Igarashi | B60L 15/2018 |
| 2018/0076633 A1* | 3/2018 | Fujita | H02J 7/00047 |
| 2018/0172777 A1* | 6/2018 | Park | H02J 7/04 |
| 2019/0156595 A1* | 5/2019 | Manji | B60L 58/16 |

* cited by examiner

INFORMATION PROCESSING SYSTEM, CONTROL DEVICE, AND VEHICLE POWER SUPPLY SYSTEM

CROSS-REFERENCE TO RELATED APPLICATIONS

This application is a U.S. national stage application of the PCT International Application No. PCT/JP2019/039072 filed on Oct. 3, 2019, which claims the benefit of foreign priority of Japanese patent application No. 2018-205527 filed on Oct. 31, 2018, the contents all of which are incorporated herein by reference.

TECHNICAL FIELD

The present invention relates to an information processing system, a control device, and a vehicle power supply system that generate setting information of a secondary battery mounted on an electric vehicle.

BACKGROUND ART

In recent years, hybrid vehicles (HVs), plug-in hybrid vehicles (PHVs), and electric vehicles (EVs) have become popular. These electric vehicles are each equipped with a secondary battery as a key device.

To improve economic efficiency and travelling performance of an electric vehicle, a method for correcting a usage section of a state of charge (SOC) has been proposed (e.g., refer to PTL 1) in which a degree of deterioration of a secondary battery is estimated, and the degree of deterioration of the secondary battery, or a magnitude of acceleration and deceleration of the electric vehicle, is used as a correction factor. However, this method is not intended to reduce deterioration of the secondary battery during traveling.

CITATION LIST

Patent Literature

PTL 1: Unexamined Japanese Patent Publication No. 2017-159741

SUMMARY OF THE INVENTION

To reduce the deterioration of the secondary battery mounted on the electric vehicle, restricting output of the secondary battery and the usage section of the SOC is effective. However, excessive restriction may cause lack of energy during traveling to cause the vehicle to stop. On the contrary, insufficient restriction may reduce effect of reducing deterioration of the secondary battery.

The present invention is made in view of such a situation, and an object of the present invention is to provide a technique for reducing deterioration of a secondary battery while ensuring required travelling performance when an electric vehicle travels on a predetermined path.

To solve the above problems, an information processing system of an aspect of the present invention includes a road information acquisition unit that acquires road information on a path from a departure place to a destination to be traveled by an electric vehicle equipped with a secondary battery, a section divider that divides the path into multiple sections based on gradient information included in the road information, an output power estimation unit that estimates output power of the secondary battery required to allow the electric vehicle to travel each of the sections at a set speed, a section electric energy estimation unit that estimates a net power consumption of each of the sections based on output power and traveling time of the corresponding one in the sections, a required capacity estimation unit that estimates capacity of the secondary battery required to travel on the path based on electric energy acquired by totaling net power consumptions in the multiple sections, a discharge-plan-candidate deriving unit that derives multiple discharge plans defined by a combination of a target SOC of the secondary battery at the time of departure from the departure place and a target SOC at the time of arrival at the destination, based on the capacity of the secondary battery, an SOC usage range calculator that calculates a target SOC at time of passing through a start point and a target SOC at time of passing through an end point of each of the sections, for each of the discharge plans, to calculate an SOC usage range of each of the sections, an output current calculator that calculates an output current of the secondary battery in each of the sections in accordance with output voltage of the secondary battery based on the output power of the secondary battery and the SOC usage range in the corresponding one of the sections, a section deterioration-amount calculator that calculates a deterioration rate or an amount of deterioration of the secondary battery in each of the sections based on the SOC usage range and the output current of the secondary battery in the corresponding one of the sections with reference to a discharge deterioration map defining a relationship between a combination of the SOC usage range in the corresponding one of the sections and a discharge rate, and the deterioration rate of the secondary battery, a total deterioration-amount calculator that calculates a total deterioration rate or a total amount of deterioration of the secondary battery which result from traveling on the path by totaling the deterioration rate or the amount of deterioration of the secondary battery in each of the multiple sections, and a discharge plan selector that selects a discharge plan minimizing the total deterioration rate or the amount of deterioration from among the multiple discharge plans.

Any combination of the components described above and a conversion of expression of the present invention between methods, devices, systems, and the like are also effective as aspects of the present invention.

According to the present invention, when an electric vehicle travels on a predetermined path, deterioration of a secondary battery can be reduced while required traveling performance is ensured.

DESCRIPTION OF EMBODIMENT

Figure 1:
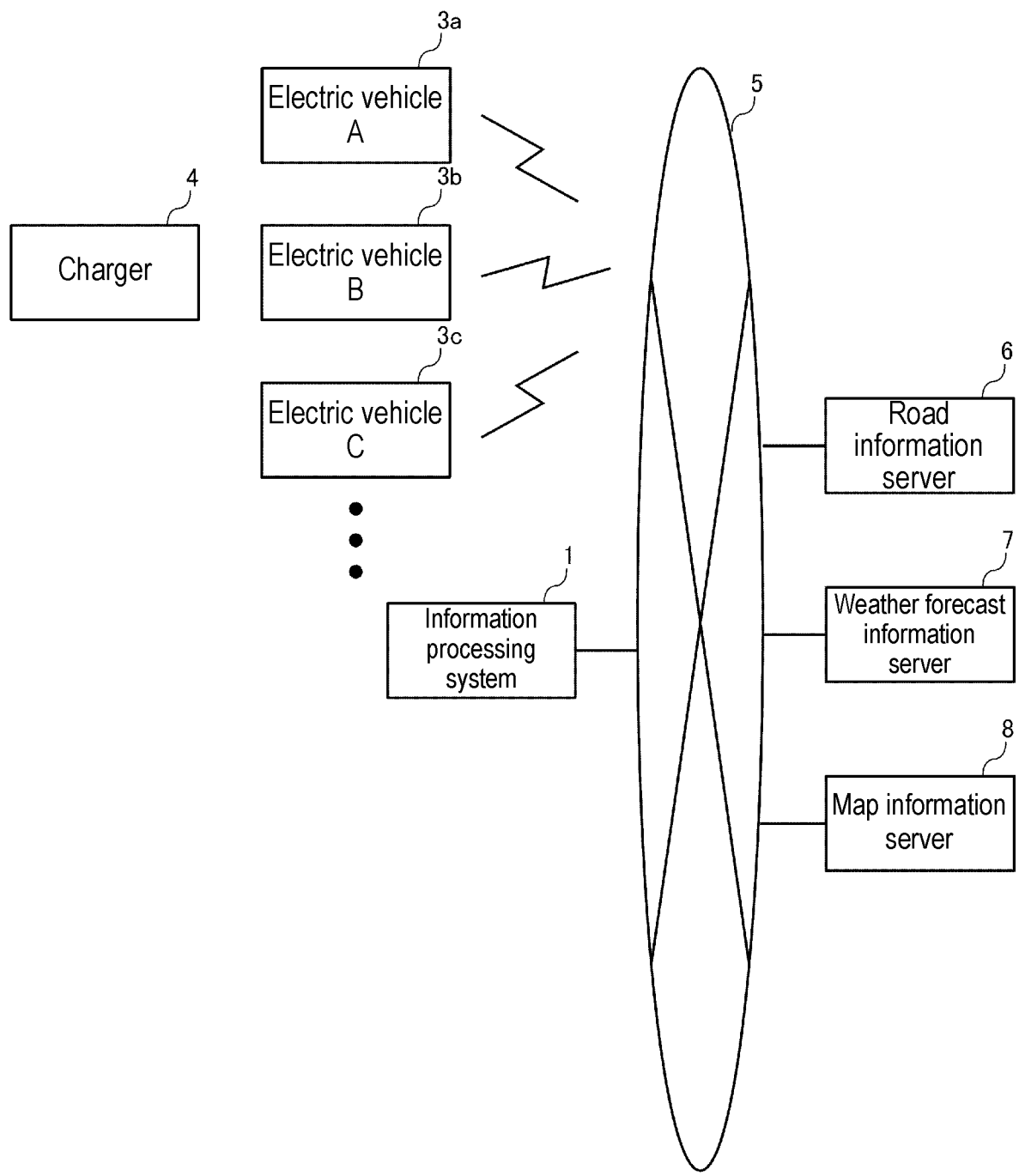
FIG. 1 is a diagram for illustrating an information processing system according to an exemplary embodiment of the present invention.

FIG. 1 is a diagram for illustrating information processing system 1 according to an exemplary embodiment of the present invention. Information processing system 1 according to a first exemplary embodiment is managed by a delivery company. The delivery company owns multiple electric vehicles 3 (electric vehicle A3a, electric vehicle B3b, electric vehicle C3c, . . . ) that can be used to carry baggage. In the present exemplary embodiment, a pure EV without an engine is assumed as electric vehicle 3. Charger 4 is for charging electric vehicle 3, and is installed in a business office or a garage of the delivery company.

Multiple electric vehicles 3 are parked in a parking lot or the garage of the business office of the delivery company during standby. Multiple electric vehicles 3 each have a wireless communication function and can be connected to network 5 to which information processing system 1 is connected. Network 5 is a general term of communication paths such as the Internet and leased lines, regardless of a communication medium or a protocol.

Network 5 is connected to various information servers such as road information server 6, weather forecast information server 7, and map information server 8.

Figure 2:
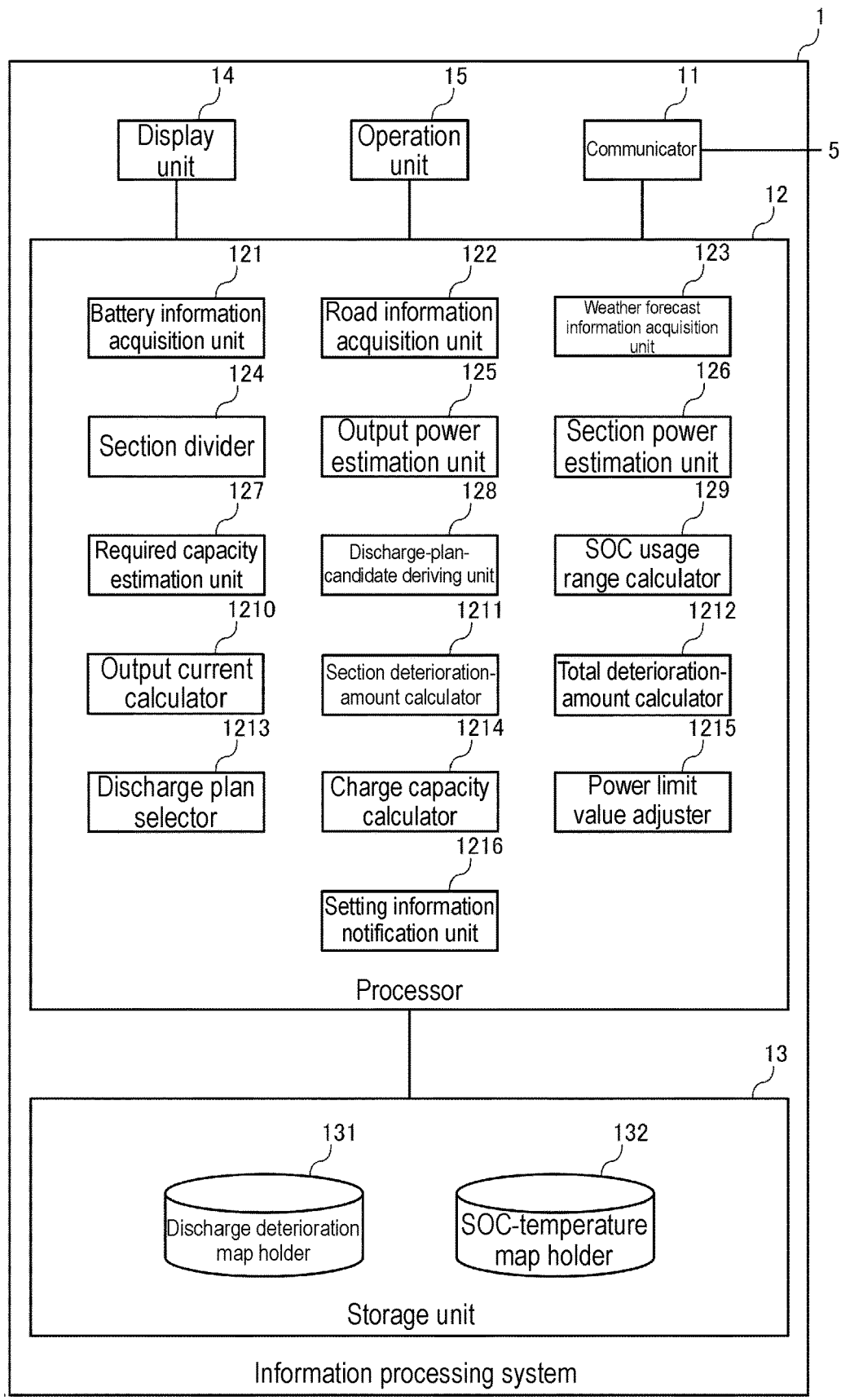
FIG. 2 is a diagram illustrating a configuration example of an information processing system according to a first exemplary embodiment.

FIG. 2 is a diagram illustrating a configuration example of information processing system 1 according to the first exemplary embodiment. Information processing system 1 is composed of, for example, one or more information processors (e.g., a server and a PC). Some or all of the information processors constituting information processing system 1 may exist in a data center on cloud.

Information processing system 1 includes communicator 11, processor 12, storage unit 13, display unit 14, and operation unit 15. Communicator 11 is a communication interface for connection to network 5 with a wire or wirelessly.

Processor 12 includes battery information acquisition unit 121, road information acquisition unit 122, weather forecast information acquisition unit 123, section divider 124, output power estimation unit 125, section electric energy estimation unit 126, required capacity estimation unit 127, discharge-plan-candidate deriving unit 128, SOC usage range calculator 129, output current calculator 1210, section deterioration-amount calculator 1211, total deterioration-amount calculator 1212, discharge plan selector 1213, charge capacity calculator 1214, power limit value adjuster 1215, and setting information notification unit 1216.

Processor 12 has a function that can be achieved by cooperation of a hardware resource and a software resource, or by the hardware resource alone. Examples of the hardware resource available include a CPU, a GPU, a ROM, a RAM, an ASIC, an FPGA, and another LSI. Examples of the software resource available include programs such as an operating system and an application.

Storage unit 13 includes a non-volatile recording medium such as an HDD or an SSD, and stores various programs and data. In the present exemplary embodiment, storage unit 13 includes discharge deterioration map holder 131 and SOC-temperature map holder 132. Storage unit 13 may be configured to allow a recording medium such as an optical disk to be attached thereto as an auxiliary storage unit. Display unit 14 includes a display such as a liquid crystal display or an organic EL display, and displays an image generated by processor 12. Operation unit 15 is a user interface such as a keyboard, a mouse, or a touch panel, and receives user operation on information processing system 1.

Figure 3:
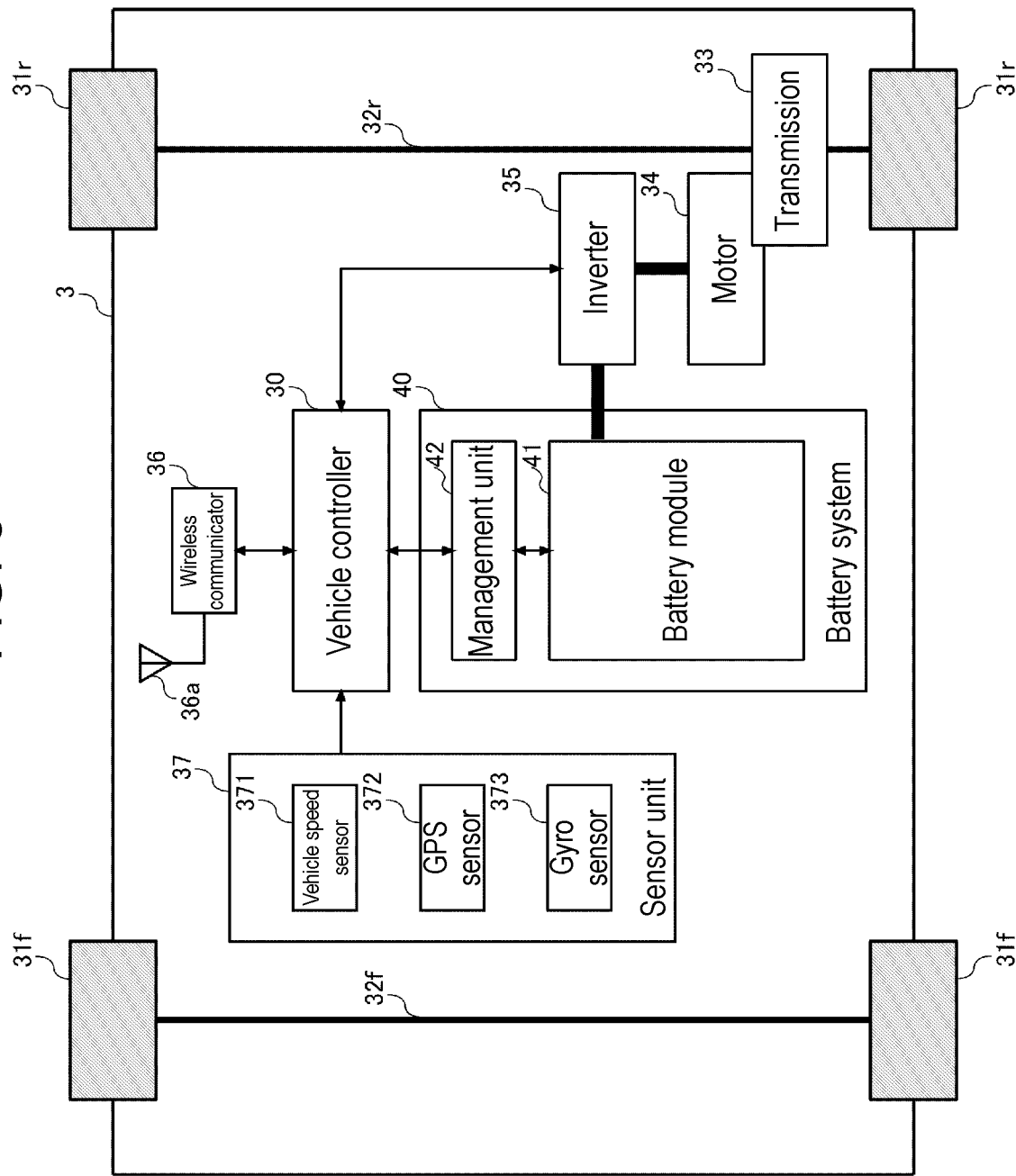
FIG. 3 is a diagram illustrating a schematic configuration of an electric vehicle.

FIG. 3 is a diagram illustrating a schematic configuration of electric vehicle 3. Electric vehicle 3 illustrated in FIG. 3 is a rear-wheel drive (2WD) EV including a pair of front wheels 31f, a pair of rear wheels 31r, and motor 34 as a power source. The pair of front wheels 31f is connected by front wheel axle 32f, and the pair of rear wheels 31r is connected by rear wheel axle 32r. Transmission 33 transmits rotation of motor 34 to rear wheel axle 32r at a predetermined conversion ratio.

Vehicle controller 30 is a vehicle electronic control unit (ECU) that controls the whole of electric vehicle 3, and may be composed of, for example, an integrated vehicle control module (VCM). Vehicle controller 30 acquires various sensor information items for detecting behavior of electric vehicle 3 and/or surrounding environment of electric vehicle 3 from sensor unit 37 in electric vehicle 3.

Sensor unit 37 is a general term of sensors installed in electric vehicle 3. FIG. 3 illustrates typical sensors such as vehicle speed sensor 371, GPS sensor 372, and gyro sensor 373.

Vehicle speed sensor 371 generates a pulse signal proportional to rotation speed of front wheel axle 32f or rear wheel axle 32r, and transmits the generated pulse signal to vehicle controller 30. Vehicle controller 30 detects speed of electric vehicle 3 based on the pulse signal received from vehicle speed sensor 371.

GPS sensor 372 detects positional information on electric vehicle 3 and transmits the detected positional information to vehicle controller 30. Specifically, GPS sensor 372 receives radio waves from multiple GPS satellites, the radio waves including their respective transmission times, and calculates latitude and longitude of the received point based on the transmission times included in respective received radio waves.

Gyro sensor 373 detects angular velocity of electric vehicle 3 and transmits the detected angular velocity to vehicle controller 30. Vehicle controller 30 can detect an inclination angle of electric vehicle 3 by integrating the angular velocity received from gyro sensor 373.

Besides this, various sensors are installed in electric vehicle 3. For example, an accelerator pedal opening sensor, a brake pedal opening sensor, a steering angle sensor, a camera, a sonar, and the like are installed.

Wireless communicator 36 performs signal processing for wireless connection to network 5 using antenna 36a. Examples of an available wireless communication network that is wirelessly connectable to electric vehicle 3 include a mobile phone network (cellular network), a wireless LAN, an electronic toll collection system (ETC), dedicated short range communications (DSRC), vehicle-to-infrastructure (V2I), and vehicle-to-vehicle (V2V).

Figure 4:
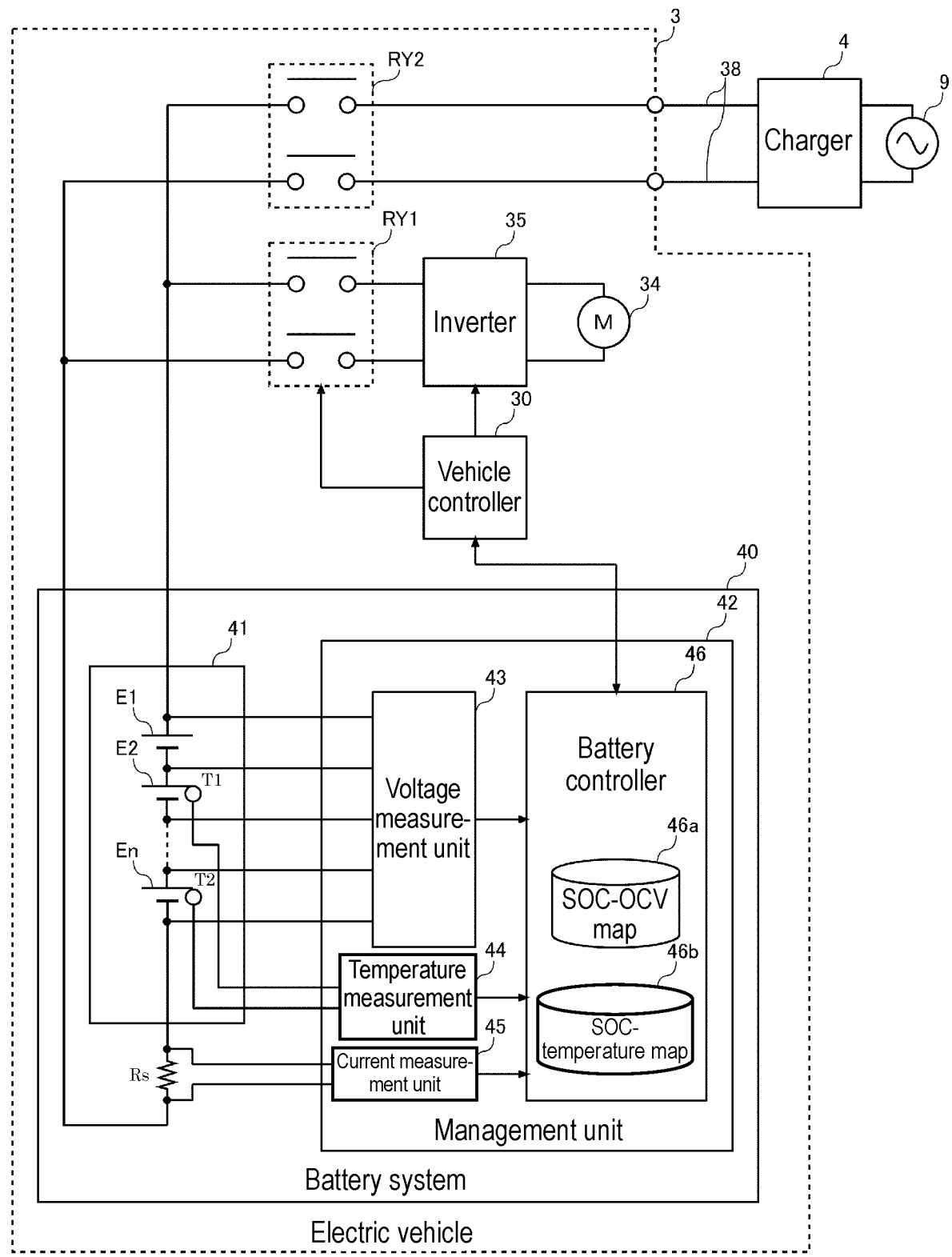
FIG. 4 is a diagram for illustrating a detailed configuration of a battery system mounted on the electric vehicle illustrated in FIG. 3.

FIG. 4 is a diagram for illustrating a detailed configuration of battery system 40 mounted on electric vehicle 3 illustrated in FIG. 3. Battery system 40 is connected to motor 34 through first relay RY1 and inverter 35. Inverter 35 converts DC power supplied from battery system 40 into AC power and supplies it to motor 34 during power running. At the time of regeneration, the AC power supplied from motor 34 is converted into DC power and supplied to battery system 40. Motor 34 is a three-phase AC motor, and rotates in accordance with the AC power supplied from inverter 35 during power running. At the time of regeneration, rotational energy by deceleration is converted into AC power and supplied to inverter 35.

First relay RY1 is a contactor provided in wiring connecting battery system 40 to inverter 35. Vehicle controller 30 controls first relay RY1 in an on-state (closed state) during traveling, and electrically connects battery system 40 to a power system of electric vehicle 3. Vehicle controller 30 controls first relay RY1 in an off-state (open state) during non-traveling in principle, and electrically interrupts battery system 40 from the power system of electric vehicle 3. Instead of the relay, another type of switch such as a semiconductor switch may be used.

Battery system 40 can be charged from commercial power system 9 when being connected to charger 4 installed outside electric vehicle 3 with charging cable 38. Charger 4 is connected to commercial power system 9 and charges battery system 40 in electric vehicle 3 using charging cable 38. In electric vehicle 3, second relay RY2 is provided in wiring connecting battery system 40 to charger 4. Instead of the relay, another type of switch such as a semiconductor switch may be used. Management unit 42 of battery system 40 controls second relay RY2 in the on-state (closed state) before start of charging, and in the off-state (open state) after the charging is completed.

In general, normal charging uses an alternating current for charging and quick charging uses a direct current for charging. When an alternating current is used for charging, AC power is converted to DC power by an AC/DC converter (not illustrated) interposed between second relay RY2 and battery system 40.

Battery system 40 includes battery module 41 and management unit 42, and battery module 41 includes a plurality of cells E1 to En connected in series. Battery module 41 may be composed of a plurality of battery modules connected in series or serial parallel. For each of the cells, a lithium-ion battery cell, a nickel hydrogen battery cell, a lead battery cell, or the like is available. Hereinafter, in the present specification, an example using a lithium-ion battery cell (having a nominal voltage of 3.6 V to 3.7 V) is assumed. The number of series of cells E1 to En is determined in accordance with a drive voltage of motor 34.

The plurality of cells E1 to En is connected to shunt resistor Rs in series. Shunt resistor Rs functions as a current detection element. Instead of shunt resistor Rs, a Hall element may be used. Battery module 41 is provided inside with a plurality of temperature sensors T1, T2 for detecting temperature of the plurality of cells E1 to En. One temperature sensor may be provided in the battery module, or one temperature sensor may be provided for each of the plurality of cells. For example, a thermistor can be used for each of temperature sensors T1, T2.

Management unit 42 includes voltage measurement unit 43, temperature measurement unit 44, current measurement unit 45, and battery controller 46. Each of nodes of respective cells E1 to En connected in series is connected to voltage measurement unit 43 with corresponding one of voltage lines. Voltage measurement unit 43 measures voltage of each of cells E1 to En by measuring voltage between two adjacent voltage lines. Voltage measurement unit 43 transmits the measured voltage of each of cells E1 to En to battery controller 46.

Voltage measurement unit 43 has a higher voltage than battery controller 46, so that voltage measurement unit 43 and battery controller 46 are connected with a communication line in an insulated state. Voltage measurement unit 43 can be composed of an application specific integrated circuit (ASIC) or a general-purpose analog front-end integrated circuit (IC).

Voltage measurement unit 43 includes a multiplexer and an A/D converter. The multiplexer outputs the voltage between two adjacent voltage lines to the A/D converter in order from the top. The A/D converter converts an analog voltage received from the multiplexer into a digital value.

Temperature measurement unit 44 includes a voltage dividing resistor and an A/D converter. The A/D converter sequentially converts a plurality of analog voltages divided by the plurality of temperature sensors T1, T2 and a plurality of voltage dividing resistors into digital values and outputs them to battery controller 46. Battery controller 46 estimates temperatures of the plurality of cells E1 to En based on the digital values. For example, battery controller 46 estimates a temperature of each of the cells E1 to En based on a value measured by the temperature sensor closest to the corresponding one of cells E1 to En.

Current measurement unit 45 includes a differential amplifier and an A/D converter. The differential amplifier amplifies voltage across shunt resistor Rs and outputs the voltage to the A/D converter. The A/D converter converts the voltage received from the differential amplifier into a digital value and outputs the digital value to battery controller 46. Battery controller 46 estimates a current flowing through the plurality of cells E1 to En based on the digital value.

When an A/D converter is mounted in battery controller 46 and an analog input port is provided in battery controller 46, temperature measurement unit 44 and current measurement unit 45 may output analog voltages to battery controller 46, and the A/D converter in battery controller 46 may convert the analog voltages into digital values.

Battery controller 46 manages a state of each of the plurality of cells E1 to En based on the voltage, temperature, and current of the corresponding one of the plurality of cells E1 to En measured by voltage measurement unit 43, temperature measurement unit 44, and current measurement unit 45, respectively. Battery controller 46 and vehicle controller 30 are connected through an in-vehicle network. For example, a controller area network (CAN) or a local interconnect network (LIN) can be used as the in-vehicle network.

Battery controller 46 can be composed of a microcomputer and a non-volatile memory (e.g., an electrically erasable programmable read-only memory (EEPROM), or a flash memory). In the non-volatile memory, SOC-open circuit voltage (OCV) map 46a and SOC-temperature map 46b are held. SOC-OCV map 46a describes characteristic data on SOC-OCV curves of the plurality of cells E1 to En.

Battery controller 46 estimates the SOC and a state of health (SOH) of each of the plurality of cells E1-En. Battery controller 46 estimates the SOC by combining an OCV method and a current integration method. The OCV method is configured to estimate the SOC based on OCV of each of the cells E1 to En measured by voltage measurement unit 43 and the characteristic data on the SOC-OCV curve described in SOC-OCV map 46a. The current integration method is configured to estimate the SOC based on the OCV at the start of charging and discharging of each of cells E1 to En and an integrated value of a current measured by current measurement unit 45. In the current integration method, a measurement error of current measurement unit 45 accumulates as charging and discharging time increases. Thus, the SOC estimated by the current integration method is preferably corrected using the SOC estimated by the OCV method.

The SOH is defined as a ratio of current full charge capacity to initial full charge capacity, and the SOH having a lower value (closer to 0%) indicates that deterioration progresses more. The SOH may be acquired by measuring capacity by complete charge and discharge, or may be acquired by adding storage deterioration and cycle deterioration. The storage deterioration can be estimated based on the SOC, the temperature, and a storage deterioration rate. The cycle deterioration can be estimated based on a SOC range used, a temperature, a current rate, and a cycle deterioration rate. The storage deterioration rate and the cycle deterioration rate can be derived in advance by experiments or simulations. The SOC, the temperature, the SOC range, and the current rate can be determined by measurement.

The SOH can also be estimated based on a correlation with internal resistance of each of the cells. The internal resistance can be estimated by dividing a voltage drop caused by allowing a predetermined current to flow through the corresponding one of the cells for a predetermined time by the current value. The internal resistance decreases as the temperature rises, and increases as the SOH decreases.

SOC-temperature map 46b defines a relationship between an SOC and a temperature of a cell, and a power limit value. The power limit value defines an upper limit value of power recommended for suppressing deterioration of a cell. A battery manufacturer determines a recommended power limit value for each of various combinations of an SOC and a temperature of a cell based on numerical simulations and experiments in advance, and maps a relationship between them. The recommended power limit value is set to, for example, a power value for avoiding progress of deterioration faster than an average life curve of a cell. The recommended power limit value is set separately for each of charge and discharge. SOC-temperature map 46b generated by the battery manufacturer is registered in the non-volatile memory in battery controller 46.

The relationship between the SOC and temperature of the cell, and the recommended power limit value may be defined as a function. Even in that case, the derived function is registered in the non-volatile memory in battery controller 46.

SOC-temperature map 46b may define a relationship between an SOC, a temperature, and an SOH of a cell, and the power limit value. A battery manufacturer determines a recommended power limit value for each of various combinations of an SOC, a temperature, and an SOH of a cell based on numerical simulations and experiments in advance, and maps a relationship between them. Instead of the SOH, internal resistance may be used.

Battery controller 46 notifies vehicle controller 30 of a state of each of the plurality of cells E1 to En through the in-vehicle network. For example, battery controller 46 calculates a SOC of the whole of battery module 41 based on a SOC of each of the plurality of cells E1-En, and notifies vehicle controller 30 of the calculated SOC of the whole of battery module 41. Battery controller 46 notifies vehicle controller 30 of the power limit value described above.

Figure 5:
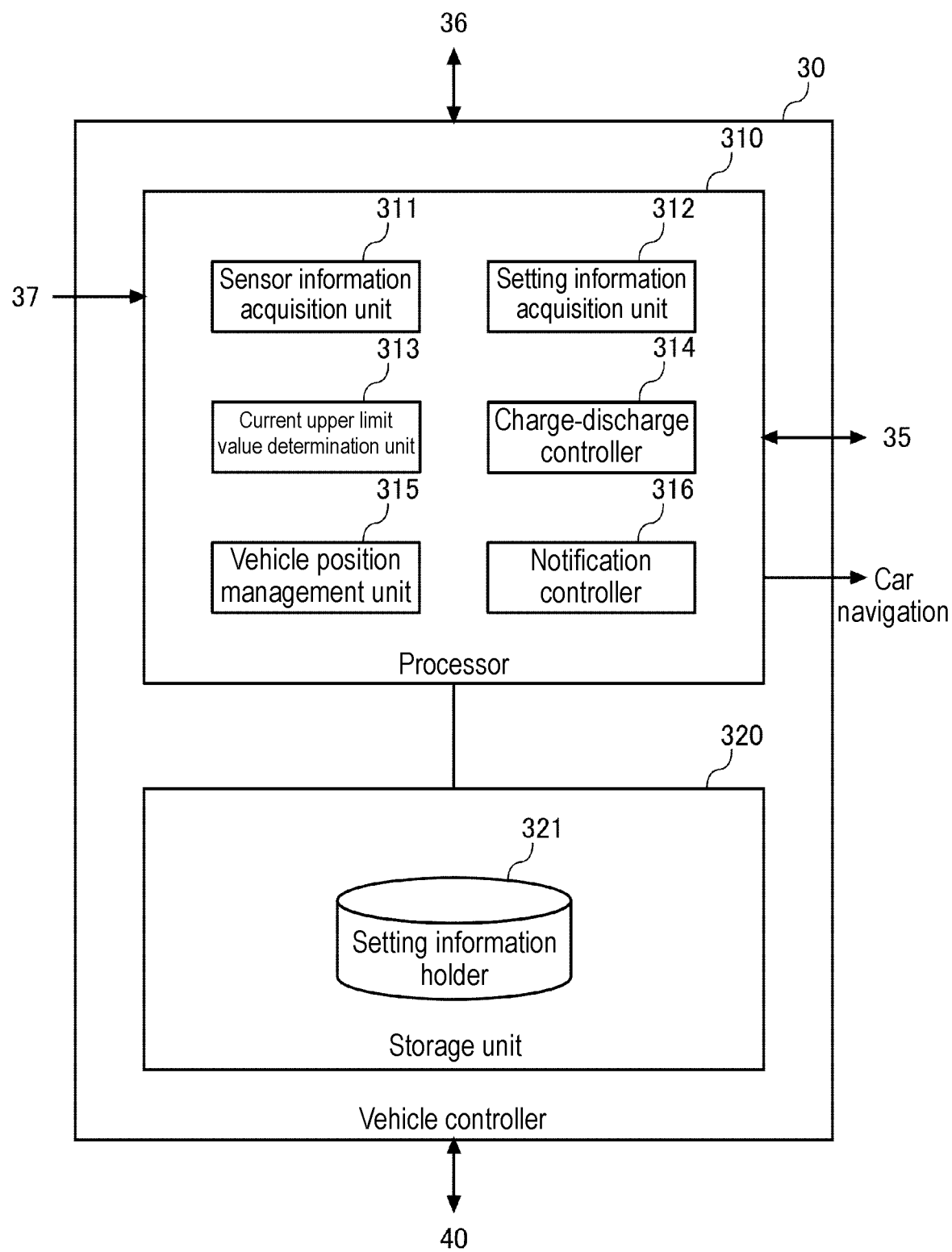
FIG. 5 is a diagram illustrating a configuration example of a vehicle controller in FIG. 3.

FIG. 5 is a diagram illustrating a configuration example of vehicle controller 30 in FIG. 3. Vehicle controller 30 includes processor 310 and storage unit 320. Processor 310 includes sensor information acquisition unit 311, setting information acquisition unit 312, current upper limit value determination unit 313, charge-discharge controller 314, vehicle position management unit 315, and notification controller 316. Processor 310 has a function that can be achieved by cooperation of a hardware resource and a software resource, or by the hardware resource alone. Examples of the hardware resource available include a CPU, a ROM, a RAM, an ASIC, an FPGA, and another LSI. Examples of the software resource available include a program such as firmware or the like.

Storage unit 320 includes a non-volatile memory (e.g., an EEPROM, a flash memory) and stores various programs and data. In the present embodiment, storage unit 320 includes setting information holder 321.

Hereinafter, there is described a method for generating setting information on a secondary battery for minimizing deterioration of the secondary battery mounted on electric vehicle 3 using information processing system 1 while ensuring travelling performance of electric vehicle 3.

Figure 6:
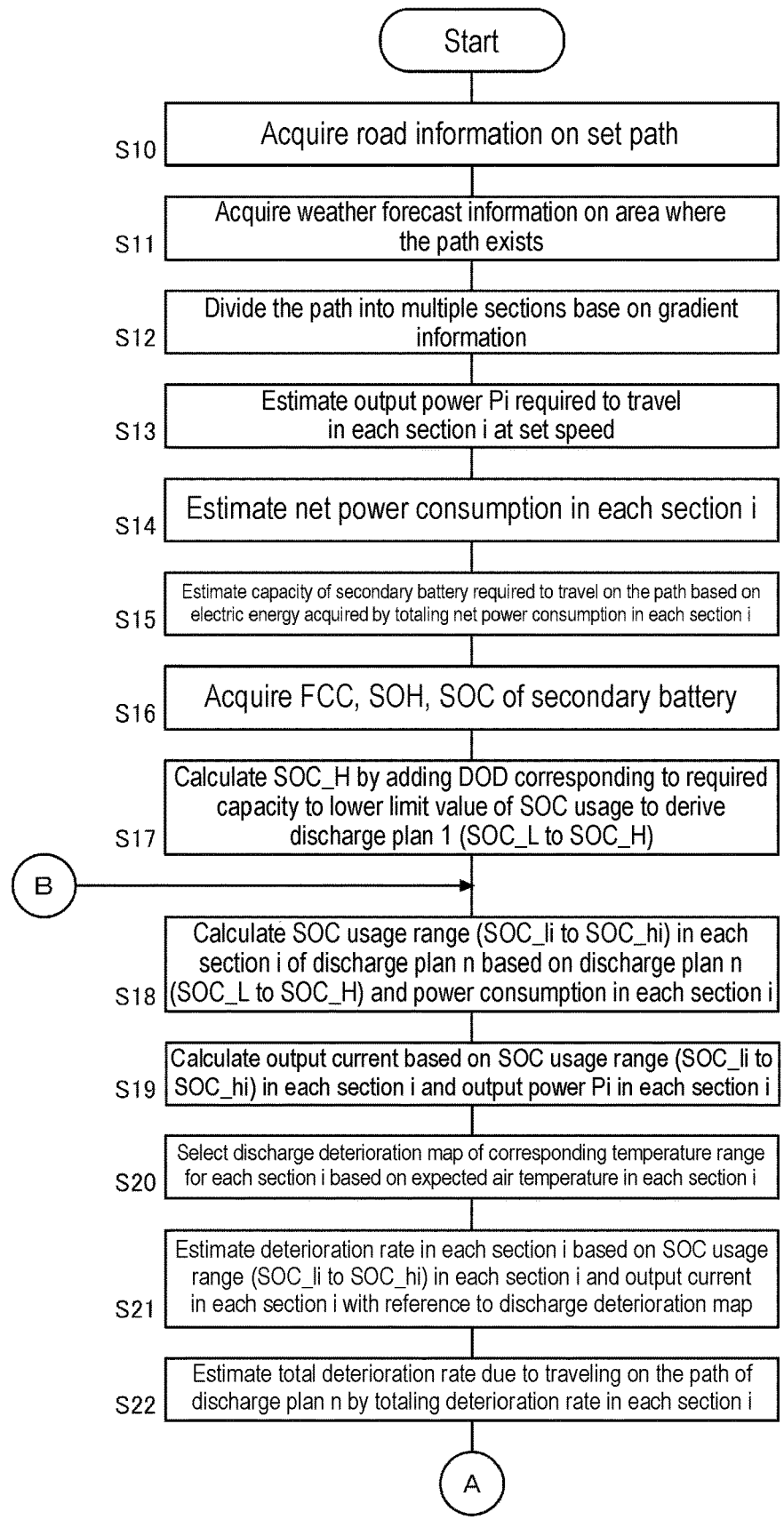
FIG. 6 is a flowchart illustrating a flow of processing for generating setting information on a secondary battery with the information processing system according to the exemplary embodiment of the present invention (part 1).
Figure 7:
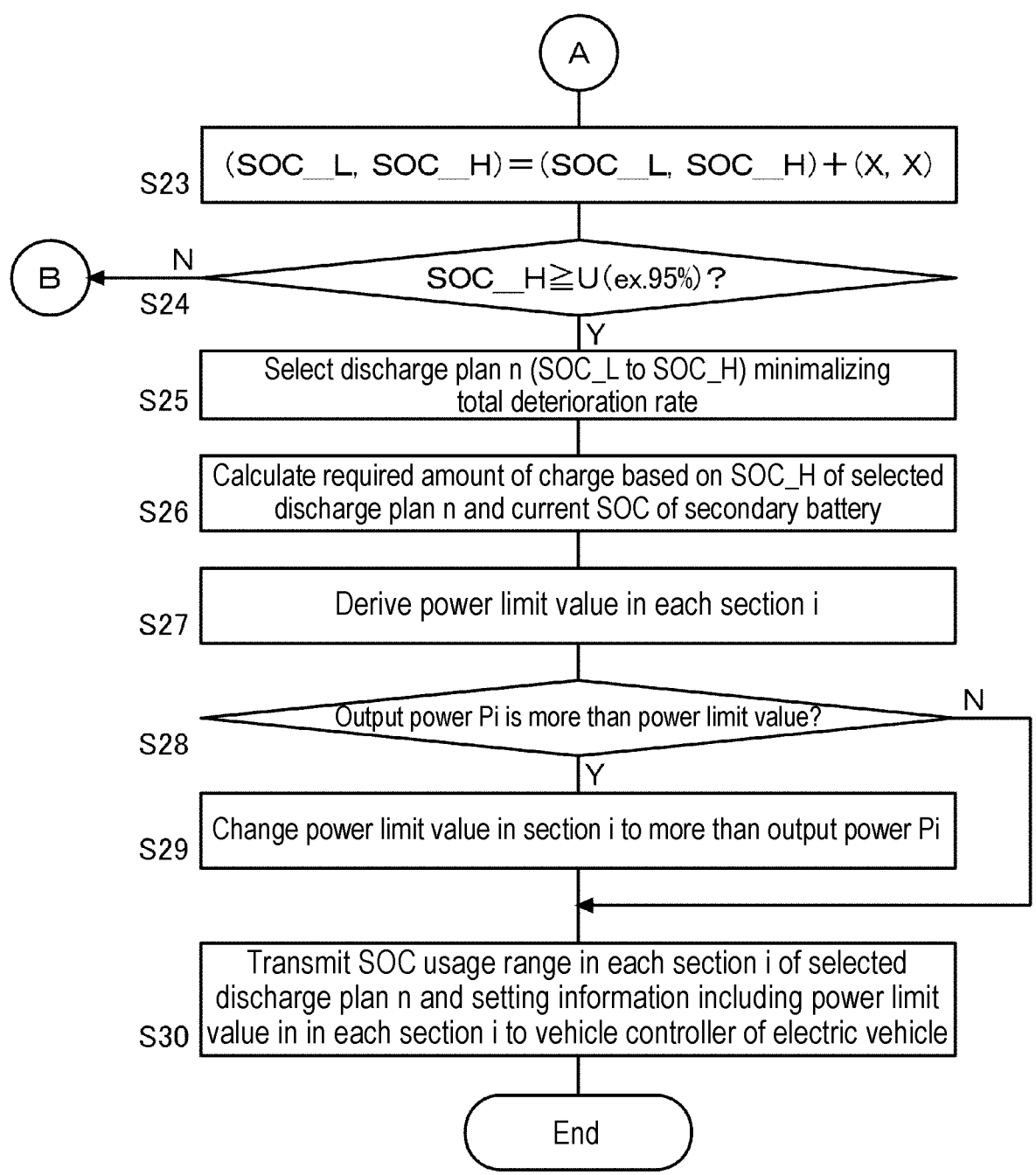
FIG. 7 is a flowchart illustrating a flow of processing for generating the setting information on the secondary battery with the information processing system according to the exemplary embodiment of the present invention (part 2).

FIG. 6 is a flowchart illustrating a flow of processing for generating the setting information on the secondary battery with information processing system 1 according to the exemplary embodiment of the present invention (part 1). FIG. 7 is a flowchart illustrating a flow of processing for generating the setting information on the secondary battery with information processing system 1 according to the exemplary embodiment of the present invention (part 2).

Road information acquisition unit 122 of information processing system 1 acquires road information on a path, which is set to allow electric vehicle 3 to be scheduled to travel, from map information server 8 and road information server 6 through network 5 (S10). The path is defined by a departure place, a destination, and a road on which electric vehicle 3 travels. A user of information processing system 1 inputs path information from operation unit 15. For example, a user interface may be used in which the path information is input by operation of selecting the departure place, the destination, and the road to be traveled on a map.

The road information acquired from map information server 8 and road information server 6 includes information on the above path, such as distance information, gradient information, speed limit information, and location information on a charging station. For example, map information server 8 acquires three-dimensional information on the road included in the above path.

Weather forecast information acquisition unit 123 acquires weather forecast information on a scheduled travel date and time in an area where the above path exists from weather forecast information server 7 through network 5 (S11). The weather forecast information to be acquired includes at least temperature information.

The section divider 124 divides the above path into multiple sections based on the gradient information included in the acquired road information (S12). In the present exemplary embodiment, the road is classified into three types including an uphill section, a flat section, and a downhill section.

Figure 8:
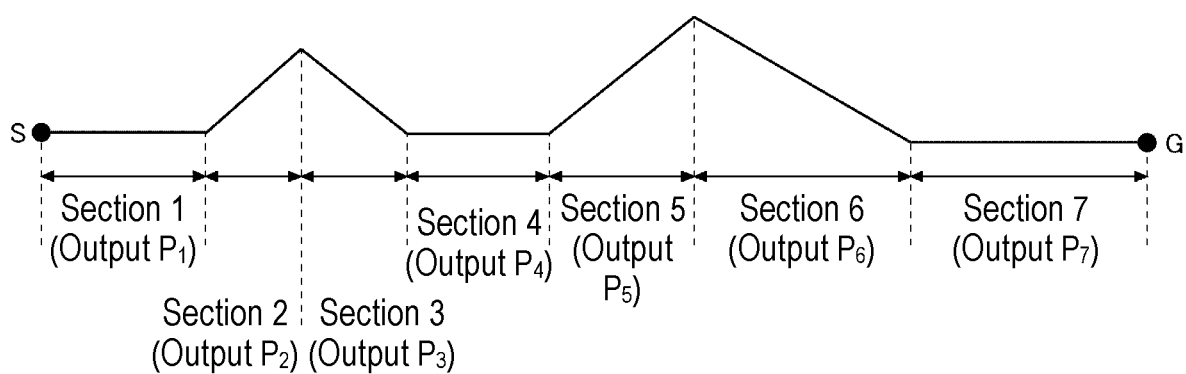
FIG. 8 is a diagram illustrating an example of a path divided into multiple sections.

FIG. 8 is a diagram illustrating an example of a path divided into multiple sections. FIG. 8 illustrates the example in which the entire path is divided into seven sections. Section 1 is a flat section, section 2 is an uphill section, section 3 is a downhill section, section 4 is a flat section, section 5 is an uphill section, section 6 is a downhill section, and section 7 is a flat section. Section divider 124 compares a gradient of each point with preset threshold values for uphill and downhill to classify the road on the above path into the uphill section, the flat section, and the downhill section.

Return to FIG. 6. Output power estimation unit 125 estimates output power Pi (i is a parameter indicating a section) of the secondary battery required for electric vehicle 3 to travel in each section at a set speed (S13). The set speed may be a speed limit in each section i or a speed input by a user. To travel more securely, a speed slower than the speed limit may be set.

Output power estimation unit 125 calculates required output of motor 34 based on an average gradient and the set speed of the road in each section i to estimate output power Pi [kW] of the secondary battery required to obtain the output of motor 34. At that time, the output power Pi [kW] of the secondary battery may be corrected based on an expected temperature, expected road surface conditions, and the like.

Section electric energy estimation unit 126 estimates a net power consumption [kWh] in each section i based on the output power Pi and traveling time in the corresponding one of the sections i (S14). The traveling time in each section i can be calculated based on a distance and the set speed in the corresponding one of the sections i. The net power consumption is obtained by subtracting the amount of regenerated power from a power consumption. On a downhill, the amount of regenerated power may be larger than the power consumption. In that case, the net power consumption is a negative value.

In a downhill section, section electric energy estimation unit 126 divides traveling time of the downhill section into acceleration time and deceleration time based on a gradient of the downhill and a set speed. Section electric energy estimation unit 126 estimates the amount of regenerated power on the downhill in accordance with rotation speed of motor 34 based on the set speed and the deceleration time. Even in a flat section or an uphill section, the amount of regenerative power may be estimated by estimating the deceleration time based on the number of traffic lights, the number of curves, and the like.

Required capacity estimation unit 127 estimates the capacity [Ah] of the secondary battery required for traveling on the above path based on electric energy acquired by totaling the net power consumption [kWh] in each section i (S15). Battery information acquisition unit 121 acquires initial full charge capacity (FCC), a current SOH, and a current SOC of the secondary battery from electric vehicle 3, which is scheduled to travel, through network 5 (S16). Current FCC can be calculated based on the initial FCC and the current SOH.

Required capacity estimation unit 127 calculates a depth of discharge (DOD) required for traveling on the above path based on the capacity [Ah] of the secondary battery required for traveling on the above path and the current FCC of the secondary battery. Discharge-plan-candidate deriving unit 128 calculates SOC_H by adding the calculated DOD to a lower limit value of the SOC of the secondary battery, and derives an SOC usage range (SOC_L to SOC_H) of discharge plan 1 of electric vehicle 3 (S17). In discharge plan 1, SOC_L is set to the lower limit value of the SOC.

In the present exemplary embodiment, the lower limit value of the SOC of the secondary battery is set to 15%, and an upper limit value thereof is set to 95%. The lower limit value is set to 15% to suppress progress of deterioration of a negative electrode due to expansion and contraction of silicon. The upper limit value is set to 95% to suppress precipitation of metallic lithium and to avoid storage of the metallic lithium in a high SOC state to suppress progress of storage deterioration of the metallic lithium. The SOC usage range from 15% to 95% is an example, and thus another SOC usage range may be set. The secondary battery can be fully used in a range from 0% to 100%.

For example, when the DOD required for traveling on the above path is 50%, the lower limit value of the SOC is 15% in the above example, and thus the SOC usage range of discharge plan 1 ranges from 15% to 65%. Discharge-plan-candidate deriving unit 128 may calculate SOC_H by adding a value, which is obtained by adding predetermined margin a to the calculated DOD, to the lower limit value of the SOC of the secondary battery. In that case, the SOC usage range of discharge plan 1 ranges from 15% to (65+α)%.

Upper limit value SOC_H of the SOC usage range of the discharge plan indicates a target SOC of the secondary battery at the time of departure from the departure place of the above path, and lower limit value SOC_L thereof indicates a target SOC of the secondary battery at the time of arrival at the destination of the above path.

SOC usage range calculator 129 calculates a SOC usage range (SOC_li to SOC_hi) in each section i of discharge plan n based on a DOD corresponding to power consumption [kWh] in each section i, and discharge plan n (SOC_L to SOC_H) (S18). Parameter n has an initial value of one. Upper limit value SOC_hi of the SOC usage range in each section i indicates a target SOC at the time of passing through a start point in each section i, and lower limit value SOC_li indicates a target SOC at the time of passing through an end point in each section i. Lower limit value SOC_li of section i coincides with upper limit value SOC_h(i+1) of section (i+1).

Output current calculator 1210 calculates an output current [A] of the secondary battery in each section i based on the SOC usage range (SOC_li to SOC_hi) and output power Pi [kW] of the secondary battery in the corresponding one of sections i (S19). Output current calculator 1210 estimates output voltage [V] of the secondary battery in each section i from the SOC usage range (SOC_li to SOC_hi) in the corresponding one of sections i based on SOC-OCV characteristics of the secondary battery. For example, the output voltage [V] of the secondary battery in each section i is estimated by estimating an OCV against an average SOC of the SOC usage range (SOC_li to SOC_hi) in the corresponding one of sections i. Output current calculator 1210 can calculate the output current [A] by dividing output power Pi [kW] of the secondary battery in each section i by the estimated output voltage [V].

In the present exemplary embodiment, a discharge deterioration map is used to estimate the amount of deterioration of the secondary battery which result from traveling on the above path. A deterioration rate (a decrease rate of an SOH) due to discharge of the secondary battery can be acquired using a function of an SOC usage range, a discharge rate, and a temperature. A designer preliminarily generates a discharge deterioration map of the secondary battery based on an experiment and a simulation, and registers it in discharge deterioration map holder 131 of information processing system 1. For example, the designer conducts a cycle test of the secondary battery while placing the secondary battery in a constant temperature oven. At that time, the discharge deterioration map is created by measuring a deterioration rate [%/√Ah] under each of combination conditions of various SOC usage ranges [%] acquired by subdividing the entire SOC usage range [%] for each predetermined range and multiple discharge rates [C]. The designer creates multiple discharge degradation maps for respective different temperature ranges. The discharge deterioration map for each of the temperature ranges is created by dividing a temperature range from −10° C. to 60° C. every 5° C. or 10° C., for example.

Section deterioration-amount calculator 1211 selects the discharge deterioration map corresponding to the temperature range for each section i based on an expected temperature in the corresponding one of the sections i during traveling (S20). Section deterioration-amount calculator 1211 estimates the deterioration rate of the secondary battery in each section i based on the SOC usage range (SOC_li to SOC_hi) and the output current (discharge rate) of the secondary battery in the corresponding one of the sections i, with reference to the selected discharge deterioration map (S21). The amount of deterioration of the secondary battery in each section i which result from traveling can be calculated by multiplying the deterioration rate by the current FCC.

Total deterioration-amount calculator 1212 estimates a total deterioration rate (deterioration cost) of discharge plan n which result from traveling on the above path by totaling the deterioration rate in each section i (S22).

Transition to FIG. 7. Discharge-plan-candidate deriving unit 128 derives an SOC usage range (SOC_L to SOC_H) of a new discharge plan by adding (X, X) to the SOC usage range (SOC_L to SOC_H) of the current discharge plan (S23). Constant X is a value to be added to the lower limit value SOC_L and the upper limit value SOC_H of the SOC usage range of the discharge plan. For example, X may be set to 10%. When discharge plan 1 has the SOC usage range of 15% to 65% as described above, discharge plan 2 has an SOC usage range of 25% to 75%, discharge plan 3 has an SOC usage range of 35% to 85%, and discharge plan 4 has an SOC usage range of 45% to 95%.

Although reducing the value of X increases possibility of reaching an ideal discharge plan with the lowest deterioration cost, the amount of calculation increases. In contrast, increasing the value of X causes an inverse relationship.

Discharge-plan-candidate deriving unit 128 compares upper limit value SOC_H of the SOC usage range of the new discharge plan with predetermined set value U (S24). In the present exemplary embodiment, set value U is set to 95%. When upper limit value SOC_H of the SOC usage range of the new discharge plan is less than set value U (N in S24), processing transitions to step S18, and then the processing from step S18 to step S23 is repeated.

When upper limit value SOC_H of the SOC usage range of the new discharge plan is more than or equal to set value U (Y in S24), discharge plan selector 1213 selects discharge plan n (SOC_L to SOC_H) having a minimum total deterioration rate from among the multiple discharge plans (SOC_L to SOC_H) (S25).

Charge capacity calculator 1214 calculates a required amount of charge based on upper limit value SOC_H of the SOC usage range of selected discharge plan n and the current SOC of the secondary battery (S26). For example, when upper limit SOC_H of the SOC usage range is 75% and the current SOC of the secondary battery is 40%, the required amount of charge is equivalent to a DOD of 35% of the secondary battery.

Power limit value adjuster 1215 derives a power limit value of each section i based on the SOC usage range (SOC_li to SOC_hi) and the expected temperature during traveling, in the corresponding one of sections i of selected discharge plan n, with reference to the SOC-temperature map held in SOC-temperature map holder 132 (S27).

Power limit value adjuster 1215 compares output power Pi in each section i of selected discharge plan n with the power limit value in the corresponding one of sections i (S28). In a section where output power Pi is larger than the power limit value (Y in S28), power limit value adjuster 1215 changes the power limit value in the section to a value higher than or equal to the output power in the section (S29). For example, the power limit value of the section is changed to a value of the output power of the section. In a section where output power Pi is less than or equal to the power limit value (N in S28), step S29 is skipped.

Setting information notification unit 1216 notifies vehicle controller 30 of electric vehicle 3 scheduled to travel of setting information including the SOC usage range (SOC_L to SOC_H) of selected discharge plan n, the SOC usage range (SOC_li to SOC_hi) in each section i, and the power limit value in each section i, through network 5 (S30). The setting information may include a required amount of charge. The setting information may also include a total amount of deterioration or a total deterioration rate of the secondary battery which result from traveling on the above path. The setting information notified from setting information notification unit 1216 is acquired by setting information acquisition unit 312 of vehicle controller 30 of electric vehicle 3, and is stored in setting information holder 321.

Figure 9:
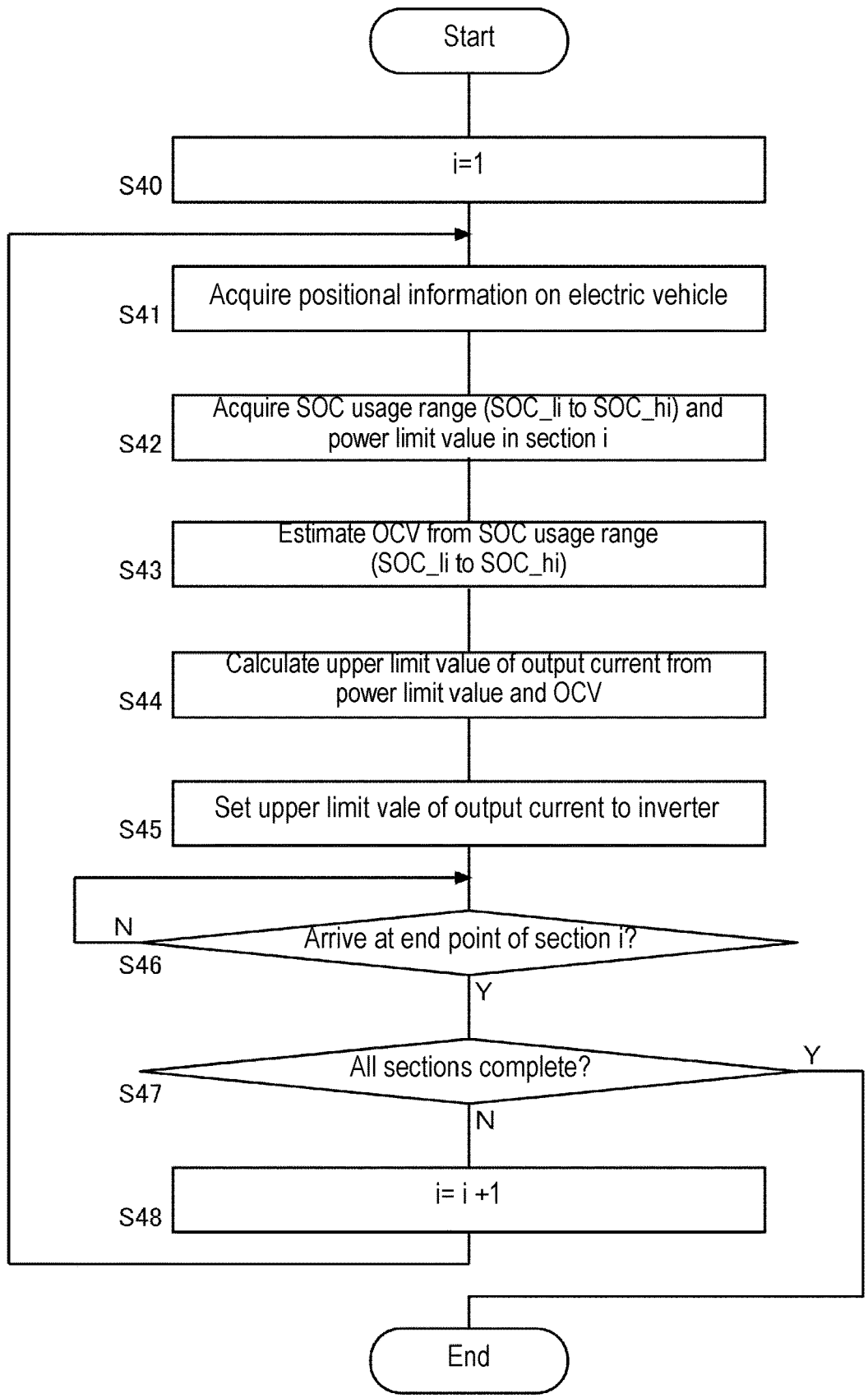
FIG. 9 is a flowchart illustrating an example of traveling control using the setting information on the secondary battery and being performed by the vehicle controller of the electric vehicle, according to the exemplary embodiment of the present invention.

FIG. 9 is a flowchart illustrating an example of traveling control using the setting information on the secondary battery and being performed by vehicle controller 30 of electric vehicle 3, according to the exemplary embodiment of the present invention. Parameter i is set to one as an initial value (S40). Sensor information acquisition unit 311 acquires current positional information on electric vehicle 3 from GPS sensor 372 (S41). Current upper limit value determination unit 313 acquires the SOC usage range (SOC_li to SOC_hi) and the power limit value of section i included in the setting information (S42). Current upper limit value determination unit 313 estimates an OCV of section i from the SOC usage range (SOC_li to SOC_hi) of section i based on the SOC-OCV characteristics of the secondary battery (S43). Current upper limit value determination unit 313 divides the power limit value of section i by the estimated OCV to determine an upper limit value of an output current in section i (S44).

Charge-discharge controller 314 sets the upper limit of the output current in section i to inverter 35 (S45). Vehicle position management unit 315 compares the current position of electric vehicle 3 with an end point of section i (S46). When electric vehicle 3 reaches the end point of section i (Y in S46), vehicle position management unit 315 determines whether the entire section of the above path is completed (S47). When the entire section of the above path is not completed (N in S47), vehicle position management unit 315 increments parameter i (S48). The processing transitions to step S41, and the processing from step S41 to step S47 is repeated. When the entire section of the above path is completed (Y in S47), the traveling control is terminated.

Figure 10:
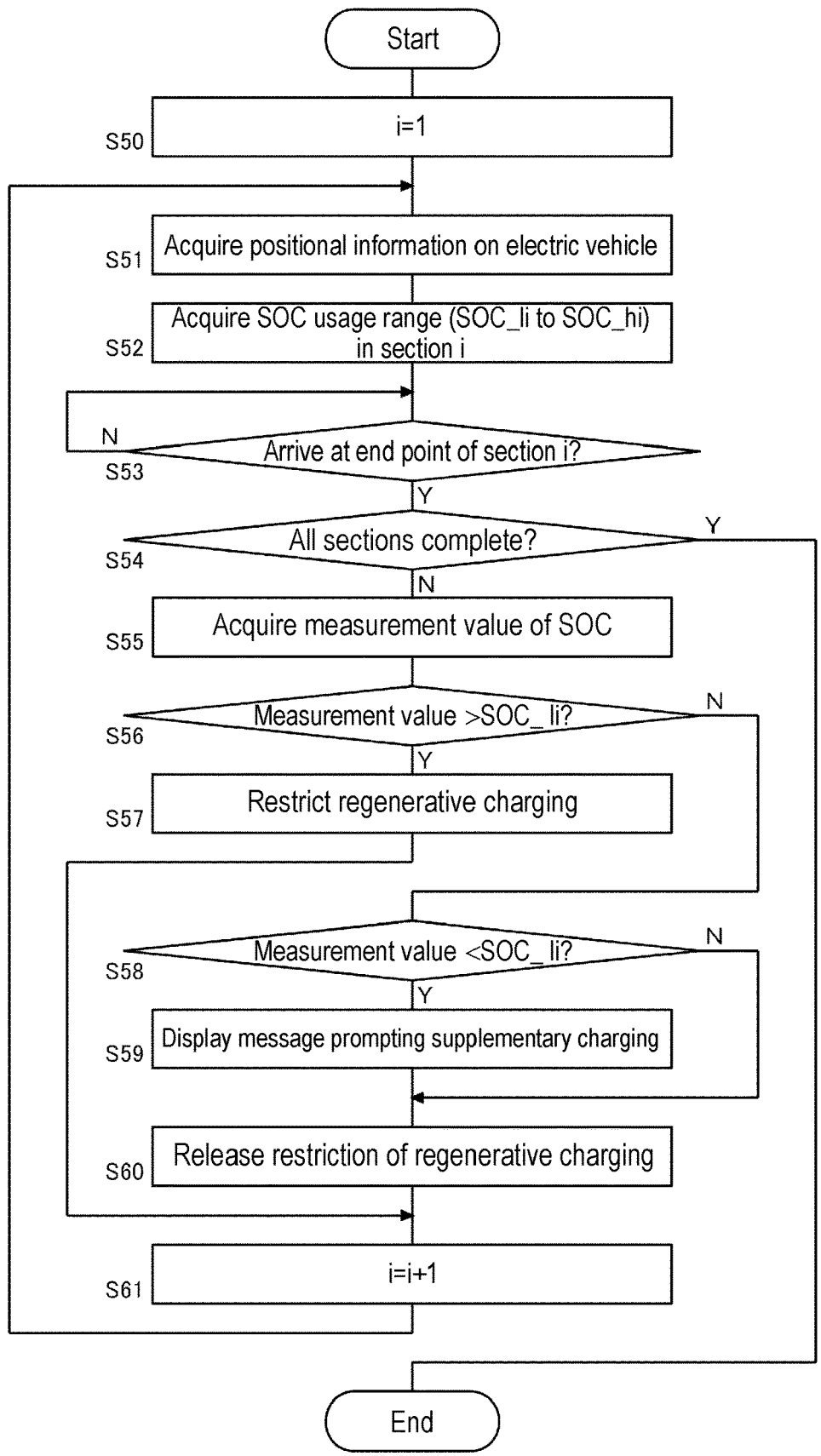
FIG. 10 is a flowchart illustrating another example of traveling control using the setting information on the secondary battery and being performed by the vehicle controller of the electric vehicle, according to the exemplary embodiment of the present invention.

FIG. 10 is a flowchart illustrating another example of traveling control using the setting information on the secondary battery and being performed by vehicle controller 30 of electric vehicle 3, according to the exemplary embodiment of the present invention. Parameter i is set to one as an initial value (S50). Sensor information acquisition unit 311 acquires the current positional information on electric vehicle 3 from GPS sensor 372 (S51). Charge-discharge controller 314 acquires the SOC usage range (SOC_li to SOC_hi) of section i included in the setting information (S52).

Vehicle position management unit 315 compares the current position of electric vehicle 3 with an end point of section i (S53). When electric vehicle 3 reaches the end point of section i (Y in S53), vehicle position management unit 315 determines whether the entire section of the above path is completed (S54). When the entire section of the above path is not completed (N in S54), charge-discharge controller 314 acquires a current SOC measurement value of the secondary battery from battery controller 46 of battery system 40 (S55).

When the acquired SOC measurement value is higher than lower limit SOC_li of the SOC usage range in section i (Y in S56), charge-discharge controller 314 controls inverter 35 to limit regenerative charging from motor 34 to battery module 41 (S57). Vehicle position management unit 315 increments parameter i (S61), and the processing transitions to step S51.

When the acquired SOC measurement value is lower than lower limit SOC_li of the SOC usage range in section i (N in S56, Y in S58), notification controller 316 causes a message for prompting the driver to supplement charge from an external charger to be displayed on a screen (S59). For example, the message is displayed on the screen of a car navigation system. At that time, notification controller 316 presents a difference value between the acquired SOC measurement value and lower limit value SOC_li of the SOC usage range in section i as a required amount of charge. Notification controller 316 also may indicate the position of the nearest charging station on a map displayed on the screen of the car navigation system. Notification controller 316 also may output a message prompting supplementary charging by voice output.

When regenerative charging is restricted, charge-discharge controller 314 releases the restriction (S60). Even when the acquired SOC measurement value and lower limit value SOC_li of the SOC usage range in section i are substantially equal (N in S56, N in S58) and regenerative charging is restricted, charge-discharge controller 314 releases the restriction (S60). Vehicle position management unit 315 increments parameter i (S61), and the processing transitions to step S51. When the entire section of the above path is completed in step S54 described above (Y in S54), the traveling control is terminated.

The present exemplary embodiment as described above enables deterioration of the secondary battery to be minimized while ensuring required travelling performance of electric vehicle 3 traveling on a predetermined path by generating a discharge plan that minimizes deterioration cost based on set speed. Discharge deterioration characteristics differ for each type of the secondary battery, and the discharge deterioration map has an uneven and complicated shape. Using a lower SOC usage range does not necessarily reduce a deterioration rate, and reducing a discharge rate does not necessarily reduce the deterioration rate. The deterioration rate changes irregularly depending on a combination of the SOC usage range and the discharge rate.

In the present exemplary embodiment, the SOC usage range and the output current are estimated for each section i, and the deterioration rate is estimated for each section i. Then, the deterioration rates of all the sections are totaled to calculate the deterioration rate for the entire path. The deterioration rate of the entire path is calculated for multiple discharge plans, and a discharge plan with a minimum deterioration rate is selected. In this way, the deterioration rate of the secondary battery is finely estimated, so that deterioration suppressing effect can be maximized. The discharge plan is generated based on set speed and road information, so that the travelling performance of electric vehicle 3 can be ensured.

During traveling of electric vehicle 3, the traveling is controlled so as to match a SOC transition specified in the discharge plan. The discharge plan defines an optimum SOC transition at the time of traveling on the above path, so that an actual power consumption less than a planned consumption is also not preferable from the viewpoint of suppressing deterioration of the secondary battery. Thus, when an actual SOC is compared with a target SOC at the end point in each section i to result in excess or deficiency, the actual SOC is controlled to coincide with the target SOC by restricting regenerative charging or supplementing charge from the outside. When the supplementary charging is performed from the outside, charging without causing the actual SOC to exceed the target SOC is important.

The present invention has been described above based on the exemplary embodiment. The exemplary embodiment is exemplified, and it is understood by those skilled in the art that various modifications are available for combinations of each of components of the exemplary embodiment and each of processing processes thereof, and that such modifications are also within the scope of the present invention.

Although in the above-described exemplary embodiment, an example is described in which information processing system 1 that generates the setting information on the secondary battery is used by a delivery company, it can also be used by other than the delivery company. For example, it can be used by a bus company, a taxi company, a rental car company, a car sharing company, a driving agency company, and the like.

In the above-described exemplary embodiment, an example is described in which information processing system 1 is installed outside electric vehicle 3. In this regard, the function of information processing system 1 may be incorporated in vehicle controller 30 of electric vehicle 3. When information processing system 1 is used by an individual, the processing is completed only by electric vehicle 3. For example, when a path is set in a car navigation system the day before departure, a required optimum amount of charge can be known. Information processing system 1 may be implemented in a smartphone. This case is also suitable for personal use.

In the above-described exemplary embodiment, the discharge plan that minimizes the deterioration cost is selected from among multiple discharge plans. In this regard, discharge plan 1 may be used as it is. In this case, the amount of calculation is reduced. When electric vehicle 3 may not travel according to a planned path, a discharge plan having the highest upper limit value SOC_H of the SOC range may be selected from among the multiple discharge plans. Additionally, a user may be able to select a discharge plan from among the multiple discharge plans.

Although in the above-described exemplary embodiment, a pure electric vehicle (EV) without an engine is assumed as electric vehicle 3, the present invention is applicable to even a hybrid vehicle (HV) or a plug-in hybrid vehicle (PHV) in a section in the above path, in which it travels using a motor.

The exemplary embodiment may be specified by the following items.

[Item 1]

Information processing system (1) including:
    road information acquisition unit (122) that acquires road information on a path from a departure place to a destination to be traveled by electric vehicle (3) equipped with secondary battery (41);

section divider (124) that divides the path into multiple sections based on gradient information included in the road information;

output power estimation unit (125) that estimates output power of secondary battery (41) required to allow electric vehicle (3) to travel each of the sections at a set speed;

section electric energy estimation unit (126) that estimates a net power consumption of each of the sections based on output power and traveling time of the corresponding one in the sections;

required capacity estimation unit (127) that estimates capacity of secondary battery (41) required to travel on the path based on electric energy acquired by totaling net power consumptions in the multiple sections;

discharge-plan-candidate deriving unit (128) that derives multiple discharge plans defined by a combination of a target SOC of secondary battery (41) at the time of departure from the departure place and a target SOC at the time of arrival at the destination, based on the capacity of secondary battery (41);

SOC usage range calculator (129) that calculates a target SOC at time of passing through a start point and a target SOC at time of passing through an end point of each of the sections, for each of the discharge plans, to calculate an SOC usage range of each of the sections;

output current calculator (1210) that calculates an output current of secondary battery (41) in each of the sections in accordance with output voltage of secondary battery (41) based on the output power of secondary battery (41) and the SOC usage range in the corresponding one of the sections;

section deterioration-amount calculator (1211) that calculates a deterioration rate or an amount of deterioration of secondary battery (41) in each of the sections based on the SOC usage range and the output current of secondary battery (41) in the corresponding one of the sections with reference to a discharge deterioration map defining a relationship between a combination of the SOC usage range in the corresponding one of the sections and a discharge rate, and the deterioration rate of secondary battery (41);

total deterioration-amount calculator (1212) that calculates a total deterioration rate or a total amount of deterioration of secondary battery (41) which result from traveling on the path by totaling the deterioration rate or the amount of deterioration of secondary battery (41) in each of the multiple sections; and discharge plan selector (1213) that selects a discharge plan minimizing the total deterioration rate or the amount of deterioration from among the multiple discharge plans.

According to this, when electric vehicle (3) travels on the above path, deterioration of secondary battery (41) can be suppressed while required traveling performance is ensured.

[Item 2]

Information processing system (1) according to item 1, further including weather forecast information acquisition unit (123) that acquires weather forecast information on a scheduled travel date and time in an area where the path exists, wherein the discharge deterioration map is generated for each of multiple temperature ranges, and section deterioration-amount calculator (1211) selects the discharge deterioration map for the corresponding one of the temperature ranges based on air temperature included in the weather forecast information and calculates the deterioration rate or the amount of deterioration of secondary battery (41) in each of the sections with reference to the selected discharge deterioration map.

According to this, the deterioration rate or the amount of deterioration of secondary battery (41) in each of the sections can be estimated more accurately.

[Item 3]

Information processing system (1) according to item 1 or 2, information processing system (1) existing outside electric vehicle (3) and further including setting information notification unit (1216) that notifies control device (30) in electric vehicle (3) of setting information including the selected discharge plan through network (5).

According to this, control device (30) in electric vehicle (3) is allowed to control traveling from the viewpoint of suppressing deterioration of secondary battery (41).

[Item 4]

Information processing system (1) according to item 1 or 2, further including power limit value adjuster (1215) that changes a power limit value in a section where output power of secondary battery (41) exceeds a power limit value defining an upper limit of power recommended to suppress deterioration of a cell included in secondary battery (41) to a value higher than or equal to the output power.

According to this, traveling can be prevented from being stopped by a power limit during traveling according to a discharge plan.

[Item 5]

Information processing system (1) according to item 4, information processing system (1) existing outside electric vehicle (3) and further including setting information notification unit (1216) that notifies control device (30) in electric vehicle 3 of setting information including at least the SOC usage range of each section of the selected discharge plan and the power limit value in each section.

According to this, control device (30) in electric vehicle (3) is allowed to control traveling from the viewpoint of suppressing deterioration of secondary battery (41).

[Item 6]

Control device (30) used in electric vehicle (3) equipped with secondary battery (41), control device (30) including:

setting information holder (321) that holds setting information including an SOC usage range in each of multiple sections acquired by dividing a path scheduled to travel, and an output limit value defining an upper limit of power recommended to suppress deterioration of a cell included in secondary battery (41);

positional information acquisition unit (311) that acquires positional information on electric vehicle (3);

current upper limit value determination unit (313) that specifies a section where electric vehicle (3) is located based on the acquired positional information, and determines an upper limit value of an output current in the specified section in accordance with voltage based on a SOC usage range in the specified section and the output limit value; and charge-discharge controller (314) that sets the upper limit value of the output current to power converter (35) for charging and discharging secondary battery (41).

According to this, an optimum upper limit value of the output current can be set to power converter (35) during traveling according to a discharge plan.

[Item 7]

Control device (30) used in electric vehicle (3) equipped with secondary battery (41), control device (30) including:
setting information holder (321) that holds setting information including at least an SOC usage range of each of multiple sections acquired by dividing a path scheduled to travel;
positional information acquisition unit (311) that acquires positional information on electric vehicle (3); and
charge-discharge controller (314) that causes power converter (35) for charging and discharging secondary battery (41) to restrict regenerative charging from traveling motor (34) to secondary battery (41) when a measurement value of an SOC of secondary battery (41) at an end point of each of the sections is higher than a lower limit value of a SOC usage range of the corresponding one of the sections.

According to this, an actual SOC transition can be brought close to an SOC transition according to a discharge plan.

[Item 8]

Control device (30) according to item 7, wherein charge-discharge controller (314) releases the restriction of regenerative charging to secondary battery (41) when the measurement value of the SOC of secondary battery (41) at the end point of each of the sections is lower than the lower limit value of the SOC usage range of the corresponding one of the sections.

According to this, an actual SOC transition can be brought close to an SOC transition according to a discharge plan.

[Item 9]

Control device (30) according to item 8, further including notification controller (316) that causes a driver to be notified of a message proposing supplementary charging from external charger (4) up to the lower limit value when the measurement value of the SOC of secondary battery (41) at the end point of each of the sections is lower than the lower limit value of the SOC usage range of the corresponding one of the sections.

According to this, an actual SOC transition can be brought close to an SOC transition according to a discharge plan.

[Item 10]

Control device (30) according to any one of items 6 to 9, wherein the setting information held by setting information holder (321) is generated by information processing system (1) according to any one of items 1 to 5.

According to this, an optimum discharge plan can be obtained.

[Item 11]

A vehicle power supply system including:
secondary battery (41) mounted on electric vehicle (3);
power converter (35) for charging and discharging secondary battery (41); and
control device (30) according to any one of items 6 to 10.

According to this, an optimum upper limit value of an output current can be set to power converter (35) during traveling according to a discharge plan. Alternatively, an actual SOC transition can be brought close to an SOC transition according to the discharge plan.

REFERENCE MARKS IN THE DRAWINGS

1: information processing system
E1-En: cell
T1: first temperature sensor
RY1: first relay
T2: second temperature sensor
RY2: second relay
3: electric vehicle
3a: electric vehicle A
3b: electric vehicle B
3c: electric vehicle C
4: charger
5: network
6: road information server
7: weather forecast information server
8: map information server
9: commercial power system
11: communicator
12: processor
13: storage unit
14: display unit
15: operation unit
30: vehicle controller
31f: front wheel
31r: rear wheel
32f: front wheel axle
32r: rear wheel axle
33: transmission
34: motor
35: inverter
36: wireless communicator
36a: antenna
37: sensor unit
38: charging cable
40: battery system
41: battery module
42: management unit
43: voltage measurement unit
44: temperature measurement unit
45: current measurement unit
46: battery controller
46a: SOC-OCV map
46b: SOC-temperature map
121: battery information acquisition unit
122: road information acquisition unit
123: weather forecast information acquisition unit
124: section divider
125: output power estimation unit
126: section electric energy estimation unit
127: required capacity estimation unit
128: discharge-plan-candidate deriving unit
129: SOC usage range calculator
131: discharge deterioration map holder
132: SOC-temperature map holder
310: processor
311: sensor information acquisition unit
312: setting information acquisition unit
313: current upper limit value determination unit
314: charge-discharge controller
315: vehicle position management unit
316: notification controller
320: storage unit
321: setting information holder
371: vehicle speed sensor
372: GPS sensor
373: gyro sensor
1210: output current calculator
1211: section deterioration-amount calculator
1212: total deterioration-amount calculator
Rs: shunt resistor
1213: discharge plan selector
1214: charge capacity calculator
1215: power limit value adjuster
1216: setting information notification unit

The invention claimed is:

1. An information processing system comprising:
a road information acquisition unit that acquires road information on a path from a departure place to a destination to be traveled by an electric vehicle equipped with a secondary battery;
a section divider that divides the path into multiple sections based on gradient information included in the road information;
an output power estimation unit that estimates output power of the secondary battery required to allow the electric vehicle to travel each of the sections at a set speed;
a section electric energy estimation unit that estimates a net power consumption of each of the sections based on output power and traveling time of the section;
a required capacity estimation unit that estimates capacity of the secondary battery required to travel on the path based on electric energy acquired by totaling the net power consumptions in the multiple sections;
a discharge-plan-candidate deriving unit that, before departure of the electric vehicle on the path, derives multiple discharge plans defined by a combination of a target state of charge (SOC) of the secondary battery at a time of departure from the departure place and a target SOC at a time of arrival at the destination, based on the capacity of the secondary battery;
an SOC usage range calculator that calculates a target SOC at a time of passing through a start point and a target SOC at a time of passing through an end point of each of the sections, for each of the discharge plans, to calculate an SOC usage range of the section;
an output current calculator that calculates an output current of the secondary battery in each of the sections in accordance with (i) the output power of the secondary battery in the section and (ii) output voltage of the secondary battery in the section, the output voltage being based on the SOC usage range in the section;
a section deterioration-amount calculator that calculates a deterioration rate or an amount of deterioration of the secondary battery in each of the sections based on the SOC usage range and the output current of the secondary battery in the section with reference to a discharge deterioration map, the discharge deterioration map defining a relationship between (i) a combination of the SOC usage range in the section and a discharge rate, and (ii) the deterioration rate of the secondary battery;
a total deterioration-amount calculator that calculates a total deterioration rate or a total amount of deterioration of the secondary battery which result from traveling on the path, by totaling the deterioration rates or the amounts of deterioration of the secondary battery in the multiple sections;
a discharge plan selector that selects a discharge plan minimizing the total deterioration rate or the amount of deterioration from among the multiple discharge plans; and
a setting information notification unit that notifies a control device in the electric vehicle of setting information including the selected discharge plan to travel according to the selected discharge plan.

2. The information processing system according to claim 1, further comprising a weather forecast information acquisition unit that acquires weather forecast information on a scheduled travel date and time in an area where the path exists,
wherein the discharge deterioration map is generated for each of multiple temperature ranges, and the section deterioration-amount calculator selects the discharge deterioration map for the corresponding one of the temperature ranges based on air temperature included in the weather forecast information and calculates the deterioration rate or the amount of deterioration of the secondary battery in each of the sections with reference to the selected discharge deterioration map.

3. The information processing system according to claim 1, wherein: the information processing system exists outside the electric vehicle, and the setting information notification unit notifies the control device in the electric vehicle of the setting information including the selected discharge plan through a network.

4. The information processing system according to claim 1, further comprising
a power limit value adjuster that changes a power limit value in a section where output power of the secondary battery exceeds a power limit value defining an upper limit of power recommended to suppress deterioration of a cell included in the secondary battery to a value higher than or equal to the output power.

5. The information processing system according to claim 4, wherein: the information processing system exists outside the electric vehicle, and the setting information notification unit notifies the control device in the electric vehicle of the setting information including at least the SOC usage range of each section of the selected discharge plan and the power limit value in each section.

6. A control device used in an electric vehicle equipped with a secondary battery, the control device comprising:
a setting information holder that holds setting information including an SOC usage range in each of multiple sections acquired by dividing a path scheduled to travel, and a power limit value defining an upper limit of power recommended to suppress deterioration of a cell included in the secondary battery;
a positional information acquisition unit that acquires positional information on the electric vehicle;
a current upper limit value determination unit that specifies a section where the electric vehicle is located based on the acquired positional information, and determines an upper limit value of an output current in the specified section in accordance with voltage based on a SOC usage range in the specified section and the power limit value; and
a charge-discharge controller that sets the upper limit value of the output current to a power converter for charging and discharging the secondary battery.

7. The control device according to claim 6, wherein
the setting information held by the setting information holder is generated by an information processing system comprising:
a road information acquisition unit that acquires road information on a path from a departure place to a destination to be traveled by an electric vehicle equipped with a secondary battery;
a section divider that divides the path into multiple sections based on gradient information included in the road information;
an output power estimation unit that estimates output power of the secondary battery required to allow the electric vehicle to travel each of the sections at a set speed;

a section electric energy estimation unit that estimates a net power consumption of each of the sections based on output power and traveling time of the section;

a required capacity estimation unit that estimates capacity of the secondary battery required to travel on the path based on electric energy acquired by totaling the net power consumptions in the multiple sections;

a discharge-plan-candidate deriving unit that, before departure of the electric vehicle on the path, derives multiple discharge plans defined by a combination of a target state of charge (SOC) of the secondary battery at a time of departure from the departure place and a target SOC at a time of arrival at the destination, based on the capacity of the secondary battery;

an SOC usage range calculator that calculates a target SOC at a time of passing through a start point and a target SOC at a time of passing through an end point of each of the sections, for each of the discharge plans, to calculate an SOC usage range of the section;

an output current calculator that calculates an output current of the secondary battery in each of the sections in accordance with (i) the output power of the secondary battery in the section and (ii) output voltage of the secondary battery in the section, the output voltage being based on the SOC usage range in the section;

a section deterioration-amount calculator that calculates a deterioration rate or an amount of deterioration of the secondary battery in each of the sections based on the SOC usage range and the output current of the secondary battery in the section with reference to a discharge deterioration map, the discharge deterioration map defining a relationship between (i) a combination of the SOC usage range in the section and a discharge rate, and (ii) the deterioration rate of the secondary battery;

a total deterioration-amount calculator that calculates a total deterioration rate or a total amount of deterioration of the secondary battery which result from traveling on the path, by totaling the deterioration rates or the amounts of deterioration of the secondary battery in the multiple sections; and a discharge plan selector that selects a discharge plan minimizing the total deterioration rate or the amount of deterioration from among the multiple discharge plans.

8. A vehicle power supply system comprising:

the control device according to claim 6;

the secondary battery mounted on an electric vehicle; and the power converter for charging and discharging the secondary battery.

* * * * *